May 1, 1951 R. B. RANSOM 2,550,861
FISHING REEL
Filed Sept. 24, 1945
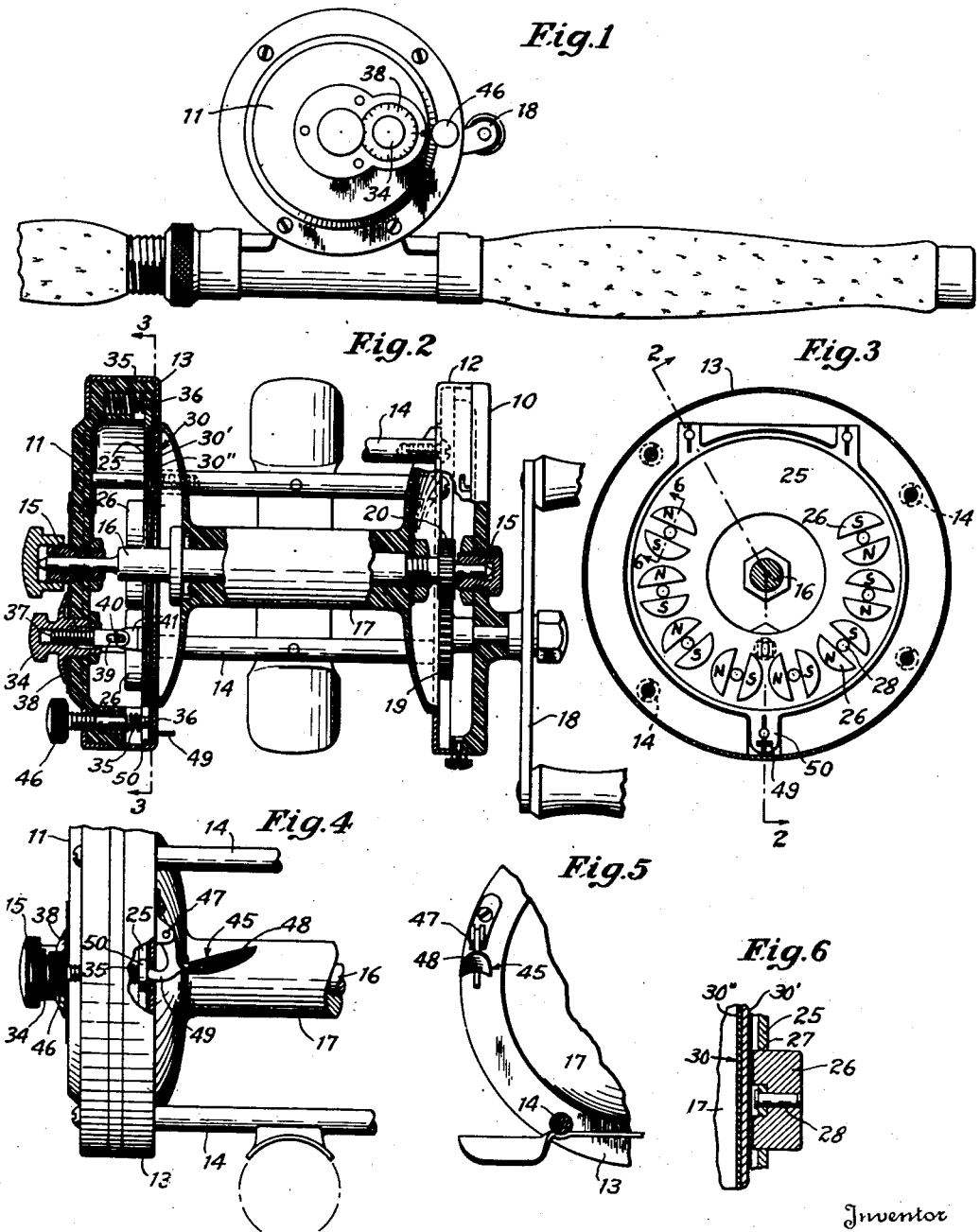
Inventor
Robert B. Ransom
By Lindsey and Robillard
Attorney Patented May 1, 1951

2,550,861

UNITED STATES PATENT OFFICE 2,550,861

FISHING REEL

Robert B. Ransom, Hamden, Conn.

Application September 24, 1945, Serial No. 618,272

10 Claims. (Cl. 242—84.5)

1

This invention relates to fishing reels such as shown in my earlier Patent No. 2,361,239 granted October 24, 1944, and having a hysteresis brake for creating a drag on the spool and thereby minimizing backlash and overrunning of the spool and consequent tangling of the line during casting or reeling out of the line from the spool.

An aim of the invention is to provide a fishing reel of this character having improved brake means which is more efficient and which has a wider range of effectiveness so as to meet the various requirements for varying types of casts and various sorts of fishermen.

A further aim of the invention is to provide an improved arrangement for controlling the restraining effect of the brake, the arrangement being such that the brake may be easily adjusted for an infinite number of settings and it is also under the constant convenient and instantaneous control of the fisherman during a casting operation.

A still further aim of the invention is to provide a fishing reel which is characterized by its simplicity in construction, by its economy in manufacture, and the ease and facility with which the parts may be assembled and taken down.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings, wherein I have shown, for illustrative purposes, one embodiment which the present invention may take—

Figure 1 is an end elevational view of my improved reel applied to a fishing rod;

Fig. 2 is a top plan view of the reel with parts broken away in the interest of clearness;

Fig. 3 is a sectional view through one end of the reel, this view being taken substantially on line 3—3 of Fig. 2 and looking in the direction of the arrows;

Fig. 4 is a longitudinal elevational view of one end portion of the reel and showing the means by which the fisherman may adjust the brake during a casting operation;

Fig. 5 is an end view of the arrangement shown in Fig. 4 looking towards the right-hand end of that figure; and Fig. 6 is a detailed view showing the manner in which the magnets may be secured to the adjustable supporting plate, this view being taken substantially on line 6—6 of Fig. 3.

2

Referring to the drawings in detail, the reel is shown as having a frame comprising end plates 10 and 11 respectively connected to rings 12 and 13 which are held in spaced-apart relation by the pillars 14. Supported in suitable bearings 15 provided in the end plates is a spindle 16 to which is secured the spool 17 which may be made of any suitable material, plastic being illustrated. The spindle, together with the spool, may be manually rotated in any suitable manner by a crank 18 operating through the gears 19 and 20.

My improved hysteresis brake is housed within the end plate 11 and comprises an adjustable plate or member 25 which supports a plurality of magnets 26 composed of high coercive force permanent magnet material, such as is disclosed in my said patent. These magnets are circularly disposed about the axis of the spindle and, while the magnets may be variously arranged, by preference, they are spaced appreciably apart with unlike poles adjacent. In the present instance, each magnet is of circular form and is diametrically grooved at one end so as to form two poles. The magnets are magnetized as a conventional horseshoe magnet. The magnets may be secured to the plate 25 in any suitable manner, as by rivets 28. The plate is shown as having openings 27 conforming to the cross sectional shape of the poles and through which the poles extend. Suitably secured to, so as to rotate with, the spool is a damping unit 30 which, in the present instance, comprises a plate or disk 30' of non-magnetic electrically-conductive material, such as copper, and a similar shaped, but thinner, plate or disk 30'' of magnetic material, such as mild steel. The non-magnetic disk and the magnetic disk are closely adjacent to each other, in the present instance, the same being in face-to-face relation. The non-magnetic disk is positioned between the poles of the magnets and the magnetic disk. The damping unit may be fixed to the spool flange in any suitable manner such as by a frictional fit.

By providing the fishing reel with a brake having a composite damping unit composed of a non-magnetic member and a magnetic member, as described, a highly efficient braking action within a relatively wide range is obtained. When the spool is rotated, during a casting operation for example, eddy currents are generated in both disks of the damping unit and the magnetic disk acts as a revolving flux path to opposite poles of magnets, thereby increasing the flux density through the non-magnetic disk. Obviously, the greater the flux passing through the non-magnetic disk at a given spool speed, the greater is the restraint. This increase in restraint is obtained with fewer number of magnets and with a damping unit which is relatively thin and light. To the ends of lightness and lower fly-wheel effect, the steel disk need not be more than fifteen or twenty percent of the thickness of the non-magnetic or copper disk.

Referring now to the manner in which the hysteresis brake may be adjusted to vary the restraining effect thereof, the magnet-supporting member or plate 25 is mounted for tilting adjustment both for a preset adjustment and a manually variable adjustment during a cast. In the present instance, the plate is resiliently urged to a position of minimum air gap between the faces of the magnets and the damping unit, and, for this purpose, the coil springs 35 are shown by way of illustration. These springs are located in pockets provided adjacent the edge of the end plate 11. For the purpose of establishing correct initial air gap, the magnet-supporting plate 25 is provided with screws 36 adapted to bear against the ring 13, as shown most clearly in Fig. 2. The plate 25 is adapted to tilt about the point of engagement between the ring 13 and the front screws 36 one of which is shown in the upper left-hand corner of Fig. 2. For the purpose of tilting the plate to preset position, which position is maintained during a casting operation, a nut 34 and a cooperating screw 37 are provided. The nut is journaled in the end plate 11 rearwardly of the spindle 16. It has a flange provided with a scale 38 for indicating the setting of the air gap. The inner end of the screw 37 has an elongated slot 39 which accommodates a pin 40 carried by a bracket 41 extending from the outer face of the magnet-supporting plate 25. When the nut or knob 34 is in zero position, the screw is in its innermost position and the air gap is at a minimum. To increase this air gap the knob or nut 34 is turned in the proper direction.

For the purpose of manually varying the air gap and thus changing the amount of drag on the reel during a casting operation, there is provided a suitable operating member 45 conveniently located for thumb operation by the user. The maximum extent to which the air gap can be increased by this member is limited by an adjustable stop screw 46 carried by the end plate 11 and having its inner end opposed to the outer end of the rear screw 36 shown in the lower left-hand corner of Fig. 2. The operating member 45 is shown by way of example as being in the form of a lever pivoted as at 47 to the ring 13 at a point substantially diametrically opposite to the point about which the plate 25 is tilted. This lever has a thumb piece 48 and an arm or finger 49, the latter being engageable against the inside face of a lug 50 extending from the periphery of the plate 25. When the thumb piece 48 is depressed, at the option of the user, the plate 25 is tilted beyond the preset position established by the screw 37, it being observed that the pin 40 can at this time move in the slot 39. When the operating lever 45 is released, the springs 35 restore the magnet plate to its preset position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim as my invention:

1. In a fishing reel of the character described, a frame, a spool rotatably supported in said frame, a non-rotatable member carried by the frame adjacent one end of said spool, a plurality of magnets composed of high coercive force permanent magnet material carried by said member with the pole faces thereof circularly arranged in a single plane and facing the said end of the spool, and a damping unit carried on the said end of the spool for rotation therewith adjacent the plane of the magnet pole faces, comprising a composite disk-like member formed of a plate of relatively thin cross section composed of non-magnetic electrically conductive material, and a backing of magnetic material substantially covering the side of the plate opposite from the magnet pole faces and not exceeding 20% of the thickness of the non-magnetic electrically conductive material.

2. In a fishing reel of the character described, a frame, a spool rotatably mounted in the frame, and a hysteresis brake for minimizing back-lash and overrunning of the spool and consisting of a plurality of circularly-arranged spaced-apart magnets composed of high coercive force permanent magnet material non-rotatably supported by the frame with the pole faces thereof in a single plane facing the spool with unlike pole faces adjacent, and a composite damping unit carried by the spool and rotatable therewith consisting of a circular member of non-magnetic electrically-conductive material having one side disposed adjacent said pole faces for rotation past the pole faces, and a thin member of magnetic material forming a flux path secured to the first member on the side opposite from the magnets.

3. In a fishing reel of the character described, a frame, a spool mounted for rotation in the frame, a plurality of circularly-arranged magnets composed of high coercive force permanent magnet material supported by the frame with the pole faces in a single plane and with unlike poles adjacent, and a composite damping unit carried by the spool for rotation in a plane parallel to and spaced from the plane of said magnet pole faces, said damping unit consisting of a member of magnetic material providing a revolving circumferential flux conducting medium and a member of non-magnetic electrically-conductive material disposed between said first-named member and the magnet pole faces, said damping unit being spaced from said magnet pole faces at a distance at which a proportion of the flux from unlike poles of the same and adjacent magnets passes through said damping unit and a proportion of said flux passes between adjacent poles without entering said damping unit, said proportions being determined by the spacing of said damping unit from said magnet pole faces.

4. In a fishing reel of the character described, a frame, a spool mounted for rotation in the frame, a plurality of circularly-arranged spaced-apart magnets composed of high coercive force permanent magnet material supported by the frame with the pole faces in a single plane and with unlike poles adjacent, and a composite damping unit carried by the spool consisting of a member of non-magnetic electrically-conductive material forming an eddy current path adjacent said magnet pole faces and a member of magnetic material on the side of said first-named member opposite from the magnet pole faces providing a revolving circumferential flux conducting medium, said damping unit in combination with said arrangement of magnets creating a tortuous, circumferential extending flux path winding in and out of said non-magnetic member and in series between adjacent unlike poles thereby cutting the non-magnetic member a maximum number of times for the number of magnets utilized.

5. In a fishing reel of the character described, a frame, a spool mounted for rotation in the frame, a plurality of circularly-arranged spaced-apart magnets composed of high coercive force permanent magnet material supported by the frame with the pole faces in a single plane and with unlike poles adjacent, and a composite damping unit consisting of a member of non-magnetic electrically-conductive material forming an eddy current path adjacent said magnet poles and a member of magnetic material on the side of said first-named member opposite from the magnet pole faces providing a revolving circumferential flux-conducting medium, said damping unit in combination with said arrangement of magnets creating oppositely directed flux paths passing between unlike poles of the same magnet and between unlike poles of adjacent magnets whereby the magnetic member is cut by the flux paths a maximum number of times for the number of magnets utilized.

6. In a fishing reel of the character described, a frame, a spool rotatably mounted in the frame; a hysteresis brake comprising a damping unit carried by said spool, a non-rotatable member mounted on said frame adjacent said unit and tiltable with respect thereto, and a plurality of magnets composed of high coercive force permanent magnet material carried by said member; and means for tiltably adjusting said member for varying the air gap between said unit and magnets.

7. In a fishing reel of the character described, a frame, a spool rotatably mounted in the frame; a hysteresis brake comprising a damping unit carried by said spool, a non-rotatable member mounted on said frame adjacent said unit and tiltable with respect thereto, and a plurality of magnets composed of high coercive force permanent magnet material carried by said member; means for presetting said member relative to said unit, and means for manually tilting said member during a cast for varying the air gap between said magnets and unit.

8. In a fishing reel of the character described, a frame, a spool rotatably mounted in the frame; a hysteresis brake comprising a damping unit carried by said spool, a non-rotatable member mounted on said frame adjacent said unit and tiltable with respect thereto, and a plurality of magnets composed of high coercive force permanent magnet material carried by said member; means for presetting said member relative to said unit, means for manually tilting said member during a cast for varying the air gap between said magnets and unit, and adjustable means for limiting the extent of tilting movement of said member.

9. In a fishing reel of the character described, a frame, a spool rotatably supported in the frame, a damping unit carried by one end of said spool and disposed radially with respect to the axis thereof, a member carried by said frame adjacent said unit and disposed generally parallel thereto, said member being mounted for tilting movement about a point located to one side of the axis of the spool, spring means for urging said member towards and into parallelism with said unit, a plurality of magnets of high coercive force permanent magnet material supported by said member in angularly spaced relation about the axis of the spool, and means for tiltably adjusting said member for varying the air gap between said unit and magnets.

10. In a fishing reel of the character described, a frame, a spool rotatably supported in the frame, a damping unit carried by one end of said spool and disposed radially with respect to the axis thereof, a member carried by said frame adjacent said unit and disposed generally parallel thereto, said member being mounted for tilting movement about a point located to one side of the axis of the spool, spring means for urging said member towards and into parallelism with said unit, a plurality of magnets of high coercive force permanent magnet material supported by said member in angularly spaced relation about the axis of the spool, presetting means for tilting said member to various positions, and manual means for tilting said member during a cast from said unit, said member being returned by said spring means to preset position relative to said unit upon release of said manual means.

ROBERT B. RANSOM.

REFERENCES CITED

The following references are of record in the file of this patent:

UNITED STATES PATENTS

| Number | Name | Date |
|---|---|---|
| 832,291 | Bryant | Oct. 2, 1906 |
| 912,504 | Steckel et al. | Feb. 16, 1909 |
| 1,898,316 | Schafer | Feb. 21, 1933 |
| 2,052,199 | Baughman | Aug. 25, 1936 |
| 2,293,748 | Johnson | Aug. 25, 1942 |
| 2,361,239 | Ransom | Oct. 24, 1944 |